United States Patent
Maeda et al.

[15] 3,691,228

[45] Sept. 12, 1972

[54] PROCESS FOR THE PREPARATION OF HALOHYDRIN ESTERS

[72] Inventors: Hiroshi Maeda; Koichi Hasegawa; Hisashi Sekiguchi; Fumio Hayakawa, all of Chiba, Japan

[73] Assignee: Dainippon Ink and Chemicals, Incorporated, Tokyo, Japan

[22] Filed: Jan. 12, 1970

[21] Appl. No.: 2,419

[30] Foreign Application Priority Data

Jan. 14, 1969 Japan ........................44/2380

[52] U.S. Cl. ........260/468 R, 260/468 B, 260/475 P, 260/485 G

[51] Int. Cl. ....C07c 69/62, C07c 69/74, C07c 69/80

[58] Field of Search................260/468, 475 P, 485 G

[56] References Cited

UNITED STATES PATENTS 3,494,605   2/1970   Rehfuss.....................260/486

*Primary Examiner*—Lorraine A. Weinberger
*Assistant Examiner*—Robert Gerstl
*Attorney*—Sherman and Shalloway

[57] ABSTRACT

A process for the preparation of halohydrin esters which comprises reacting a carboxylic anhydride with an epoxy halogen compound in the presence of water and a tertiary alcohol.

2 Claims, No Drawings

PROCESS FOR THE PREPARATION OF HALOHYDRIN ESTERS

This invention relates to an improved process for the preparation of halohydrin esters which are intermediates of ester-type epoxy resins, which comprises reacting a carboxylic anhydride and an epoxy halogen compound in the presence of water.

The most characteristic feature of this invention resides in that a tertiary alcohol is made co-existent in conducting the reaction between a carboxylic anhydride and an epoxy halogen compound in the presence of water, whereby occurrence of undesired side-reactions can be prevented and halohydrin esters can be prepared in an industrial scale at a very low cost without useless consumption of starting materials.

A process has been known for the preparation of halohydrin esters which comprises reacting an epoxy halogen compound with a divalent carboxylic acid to esterify the epoxy group by ring-opening. The divalent carboxylic acid component of the halohydrin ester which is used as an intermediate of an ester-type epoxy resin is industrially obtained, in many cases, in the form of an anhydride. Accordingly, divalent carboxylic acids are generally prepared by adding water to acid anhydrides. As the so prepared divalent carboxylic acid contains free water not consumed for the ring-opening of the acid anhydride, the above mentioned method is disadvantageous in that the water causes the ring-opening of the epoxy group of the epoxy halogen compound.

Another proposal has been made of reacting a carboxylic anhydride directly with an epoxy halogen compound. However, in accordance with this proposal the intended halohydrin ester is not formed but various polymers are obtained by ring-opening copolymerization of both reactants. Even when the above reaction is conducted in the presence of water, the fundamental halohydrin ester having the molecular structure in which one molecule of the divalent carboxylic acid is bonded to two molecules of the epoxy halogen compound by the ester-linkage cannot be satisfactorily obtained by polyesterified halohydrins or carboxylic compounds are formed by the reaction of the first formed ester with additional divalent carboxylic acid and epoxy halogen compound.

It must be noted that the use of an acid anhydride is deemed advantageous in that the reaction may be performed at a lower temperature because an acid anhydride has a lower melting point than that of the corresponding ring-opened product, and the reaction rate may be increased. Accordingly, it has been demanded in the art to develop a method capable of giving the above mentioned desired halohydrin ester selectively while preventing formation of by-products.

An object of this invention is to provide a process in which the above mentioned desired halohydrin ester, namely, a halohydrin ester consisting of one molecule of a carboxylic anhydride is obtained. Two molecules of an epoxy halogen compound and one molecule of water can be prepared at a very high yield from the epoxy halogen compound and acid anhydride in the presence of water.

It must be taken into consideration that in conducting the process of this invention, a part of the intended halohydrin ester is converted to an epoxy ester because the halohydrin ester undergoes the epoxy-exchange reaction with the unreacted epoxy halogen compound. However, this fact does not give any particular disadvantage to the practice of the process of this invention nor change the substantial technical concept of the invention, because the halohydrin ester which is the intended product of this invention is, as described above, used principally as the intermediate for the preparation of ester type epoxy resins (epoxy esters) and because the halohydrin does not bond to additional carboxylic acid anhydride and epoxy halogen compound to form a product of a greater molecule structure, even when it is epoxidized by the epoxy-exchange reaction. Therefore, the "yield" of the halohydrin referred to in this specification means the yield of the sum of the halohydrin ester and the epoxidized product thereof calculated as the halohydrin ester.

With a view to attaining the above object, research has been made on catalysts usable for the above reaction, and it has been unexpectedly found that when a carboxylic anhydride is reacted with at least a stoichiometric amount, preferably an excessive amount, of an epoxy halogen compound in the presence of a tertiary alcohol, such as tertiary butanol or tertiary amyl alcohol, a fundamental halohydrin ester can be prepared at a yield of more than 90 percent based on the starting carboxylic anhydride. Further, it has been also found that the above process can bring about the following various advantages; the reaction temperature can be lowered and the reaction rate can be increased, as compared with the case where a carboxylic acid is used; the epoxy halogen compound is not consumed uselessly; and reaction operations such as agitation can be performed quite easily.

The reason why the tertiary alcohol is effective as a catalyst has not been determined completely, but it is believed that such excellent catalytic activity may be due to the fact that the tertiary alcohol may react with the carboxylic anhydride prior to the reaction between the carboxylic anhydride and other component.

As the carboxylic anhydride to be used as one of starting materials of the intended halohydrin ester there may be cited, for instance, phthalic anhydride, tetrahydrophthalic anhydride, hexahydrophthalic anhydride, tetrabromophthalic anhydride, chlorendic anhydride, maleic anhydride, itaconic anhydride, succinic anhydride, dodecenylsuccinic anhydride, trimellitic anhydride, methylcyclohexenetricarboxylic anhydride, pyromellitic dianhydride and benzophenonetetracarboxylic dianhydride. The epoxy halogen compounds to be used in this invention include 1,2-epoxy-3-chloropropane, 1,2-epoxy-bromopropane, 1,2-epoxy-3-chlorobutane, 1,2-epoxy-3-bromobutane, 2,3-epoxy-1-chlorobutane, 2,3-epoxy-1-bromobutane, 1,2-epoxy-3-chloroisobutane, 1,2-epoxy-3-bromoisobutane and the like. Various tertiary alcohols may be used in this invention. The use of tertiary butanol and tertiary amyl alcohol is particularly preferred, because these two alcohols can be distilled off together with the unreacted epoxy halogen compound after completion of the reaction.

It is preferable that the epoxy halogen compound is reacted with the carboxylic anhydride at a ratio of two to 20 moles of the epoxy halogen compound per one equivalent of anhydrous carboxyl group

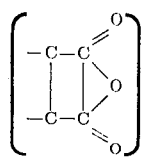

The lower limit of two moles is the stoichiometric amount. The use of an excessive amount of the epoxy halogen compound is preferred because the excess of the epoxy halogen compound prevents the resulting halohydrin ester from bonding to additional carboxylic anhydride by the ester-linkage. However, it is unnecessary to use the epoxy halogen compound in an amount exceeding 20 moles per one equivalent of the anhydrous carboxyl group. In case a carboxylic anhydride containing a free carboxyl group is used, it is suitable to use additional epoxy halogen compound in an amount of one to 10 moles per one equivalent of the free carboxyl group. Water is preferably used in an amount of one to 1.1 moles per one equivalent of the anhydrous carboxyl group. No particular disadvantage is caused by using water in an amount exceeding the above range to some extent, but in case water is used in great excess, lowering of the recovery ratio of the epoxy halogen compound is caused to occur.

The amount of the tertiary alcohol sufficient to exhibit a catalytic activity is at least 0.05 mole per one equivalent of the anhydrous carboxyl group. A substantial effect cannot be attained with the use of the tertial alcohol in an amount less than the above lower limit. On the other hand, when the amount of tertiary alcohol used exceeds two moles, no particular increase of the effect occurs but additional operational troubles are required for removing unreacted matters. A most preferable amount of the tertiary alcohol is in the range of 0.1 to 1 mole per one equivalent of the anhydrous carboxyl group.

These starting materials are heated under reflux for 0.5 to 3 hours. In the invention it is possible to add to the reaction system a catalytic amount of a reaction-promoting substance such as a tertiary amine, a quaternary ammonium salt, an alkali metal hydroxide, lithium chloride and boron trifluoride according to need.

The intended halohydrin ester is prepared in accordance with the above mentioned procedures. The resulting reaction mixture sometimes contains, in addition to the intended halohydrin ester, an epoxy ester which has been formed by the epoxidation (dehydrohalogenation) of a part of the resulting halohydrin ester. The formation of the epoxy ester is conspicuous particularly when the epoxy halogen compound is used in excess. When the reaction mixture is distilled after completion of the reaction, the intended halohydrin ester can be recovered singly or in the form of a mixture with the above mentioned epoxy ester.

The so formed halohydrin ester can be converted to an epoxy ester by dehydrohalogenating the halohydrin ester to cyclize the same. As the method of converting the halohydrin ester to an epoxy ester there may be cited a method comprising adding a basic compound to the halohydrin ester and dehydrohalogenating it while taking sufficient care not to hydrolyze the ester-linkage of the halohydrin ester, and a method comprising adding to the halohydrin ester the same epoxy halogen compound as used in the preparation of the halohydrin ester together with a catalyst and causing the epoxy exchange reaction between them to thereby dehydrohalogenate the halohydrin ester.

Particularly in the case of a carboxylic acid-2-hydroxy-3-halobutyl ester prepared by employing an epoxy halobutane, for instance, 1,2-epoxy-3-chlorobutane or 1,2-epoxy-3-chloroisobutane as the epoxy halogen compound, the dehydrohalogenation can be effected at high temperatures for a short period of time only by adding an aqueous solution containing strong base such as caustic soda in the minimum stoichiometric amount required for the dehydrohalogenation.

The above dehydrohalogenation for ring-closing the halohydrin ester may be conducted subsequently to the preparation of the halohydrin ester without recovering it from the reaction tank or purifying it.

The so formed epoxy ester can be converted to various types of three-dimensional, cross-linked, non-meltable, insoluble hardened products with an aid of known hardening agents. Such hardened products exhibit excellent wetherability over hardened products prepared from ether-type epoxy resins. Further, the carboxylic anhydride to be used as one of starting materials in the present invention can be selected from a broad range, even from an industrial viewpoint. Therefore, a variety of halohydrin esters can be prepared in accordance with this invention and they can be broadly utilized in various fields.

The invention will be now detailed by referring to examples. In case the reaction product contains an epoxy ester resulting from the epoxidation (dehydrohalogenation) of the halohydrin ester, the values of yield, halohydrin equivalent, molecular weight, etc. of the reaction product are those of both the halohydrin ester and the epoxy ester calculated as the halohydrin ester. When the excess epoxy halogen compound is partially recovered in the form of a di-halohydrin, the recovery ratio is that of both the recovered epoxy halogen compound and di-halohydrin calculated as the epoxy halogen compound.

EXAMPLE 1

A reactor equipped with a stirrer, a reflux condenser and a thermometer was charged with 148 g (1 mole) of phthalic anhydride, 277 g (3 moles) of 1,2-epoxy-3-chloropropane, 0.3 cc of triethyl amine, 18 g (1 mole) of water and 74 g (1 mole) of tertiary butanol. The mixture was refluxed under stirring for 4 hours and unreacted matters were removed by distillation. Some 348 g of a faintly yellow viscous resinous product were obtained. The chlorohydrin equivalent of the product was 190, the acid value was less than 0.1 and the molecular weight was 375.

Bis(2-hydroxy-3-chloropropyl)phthalate intended in this Example has a chlorohydrin equivalent of 176 and a molecular weight of 351, and the stoichiometric yield is 351 g. Thus, it is seen that the content of the by-products in the product of this Example was extremely low, and it is construed that the yield of the intended product would be more than 95 percent based on phthalic anhydride. The recovery ratio of the excess of 1,2-epoxy-3-chloropropane was more than 95 percent.

When the above Example was repeated without employing tertiary butanol as the catalyst, both the molecular weight and the chlorohydrin equivalent of the resulting product were more than two times as great as those of the above mentioned product, and it could not be put into practical use. It is construed that this control product contained various polyesters having an undesired, high molecular weight.

EXAMPLE 2

A reaction similar to that used in Example 1 was charged with 77 g (0.5 mole) of hexahydrophthalic anhydride, 213 g (2 moles) of 1,2epoxy-3-chloroisobutane, 9 g (0.5 mole) of water and 7.4 g (0.1 mole) of tertiary butanol, and the temperature of the reaction system was raised to the refluxing temperature under stirring. Immediately thereafter, 0.2 c.c. of triethyl amine was added to the system and the system was maintained at the refluxing temperature for 4 hours. Then, unreacted matters were removed from the reaction mixture by distillation to obtain 190 g of a faintly yellow viscous resinous product having a chlorohydrin equivalent of 201, an acid value of less than 0.1 and the molecular weight of 413. Bis(2-hydroxy-3-chloroisobutyl)hexahydrophthalate intended in this Example has a chlorohydrin equivalent of 192.6 and a molecular weight of 385.2. The stoichiometric yield of the hexahydrophthalate is 183.5 g.

EXAMPLE 3

A reactor was charged with 77 g (0.4 mole) of trimellitic anhydride, 334 g (3.6 moles) of 1,2-epoxy-3-chloropropane, 8 g (0.44 mole) of water and 18 g (0.22 mole) of tertiary amyl alcohol, and the temperature was raised to the refluxing temperature under stirring. Immediately thereafter, 0.7 cc of N,N'-dimethylbenzyl amine was added to the reaction system and it was maintained at the refluxing temperature for 5 hours. Unreacted matters were removed from the reaction mixture by distillation. In this way 188 g of a faintly yellow viscous resinous product having a chlorohydrin equivalent of 186, an acid value of 0.1 and a molecular weight of 594 were obtained.

EXAMPLE 4

A reactor was charged with 29 g (0.3 mole) of maleic anhydride, 412 g (3 moles) of 1,2-epoxy-3-bromopropane, obtained. g (0.45 mole) of tertiary butanol, 7.2 g (0.4 mole) of water and 0.8 cc of triethyl amine, and the reaction system was refluxed for 3.5 hours under stirring. Then, unreacted matters were removed by distillation under reduced pressure at a temperature lower than 80° C. and as a result, 153 g of a reddish viscous resinous product having a bromohydrin equivalent of 204, an acid value of less than 0.1 and a molecular weight of 411 were 0.1

EXAMPLE 5

A reactor was charged with 139 g (0.3 mole) of tetrabromophthalic anhydride, 320 g (3 moles) of 1,2-epoxy-3-chloroisobutane, 11 g (0.15 mole) of tertiary butanol, 5.4 g (0.3 mole) of water and 1 cc of tributyl amine, and the reaction system was refluxed for 5 hours under stirring. Unreacted matters were removed by distillation to obtain 196 g of a reddish brown, highly viscous resinous product having a chlorohydrin equivalent of 322, an acid value of 0.1 and a molecular weight of 783.

EXAMPLE 6

A reactor was charged with 68 g (0.4 mole) of endomethylene-tetrahydrophthalic anhydride, 341 g (3.2 moles) of 1,2-epoxy-3-chloroisobutane, 7 g (0.4 mole) of water, 53 g (0.6 mole) of tertiary amyl alcohol and 0.7 cc of tributyl amine, and the reaction system was refluxed for 4.5 hours under agitation. Unreacted matters were removed by distillation to obtain 154 g of a faintly yellowish viscous resinous product having a chlorohydrin equivalent of 206, an acid value of less than 0.1 and a molecular weight of 453.

EXAMPLE 7

A mixture of 30 g (0.2 mole) of phthalic anhydride, 3.3 g (0.03 mole) of citraconic anhydride, 384 g (4.2 moles) of 1,2-epoxy-3-chloropropane, 5 g (0.28 mole) of water, 44.5 g (0.6 mole) of tertiary butanol and 0.8 cc of N,N'-dimethylbenzyl amine was refluxed for 3.5 hours. Unreacted matters were removed by distillation under reduced pressure at a temperature lower than 80° C. Some 105 g of a faintly red viscous resinous product having a chlorohydrin equivalent of 196, an acid value of less than 0.1 and a molecular weight of 453 were obtained.

EXAMPLE 8

A mixture of 53.4 g (0.3 mole) of methylendomethylenetetra-hydrophthalic anhydride, 321 g of 1,2-epoxy-3-chlorobutane, 5.4 g (0.3 mole) of water, 22.2 g (0.3 mole) of tertiary butanol and 0.9 g of trimethylbenzyl ammonium chloride was refluxed for about 6 hours under stirring. Unreacted matters were removed to obtain 136 g of a faintly yellow viscous resinous product having a chlorohydrin equivalent of 208, an acid value of less than 0.1 and a molecular weight of 412.

EXAMPLE 9

A mixture of 45.6 g (0.3 mole) of tetrahydrophthalic anhydride, 321 g (3 moles) of 2,3-epoxy-1-chlorobutane, 5.4 g (0.3 mole) of water, 25.8 g (0.3 mole) of tertiary amyl alcohol and 0.6 g of triethylene diamine was refluxed for about 5 hours under agitation. Unreacted matters were removed and 125 g of a faintly yellow viscous resinous product having a chlorohydrin equivalent of 200, an acid value of less than 0.1 and a molecular weight of 415 were obtained.

EXAMPLE 10

The same reactor as used in Example 1 was charged with 70 g (0.16 mole) of tetrabromophthalic anhydride, 17 g (0.23 mole) of tertiary butanol, 2.7 g (0.15 mole) of water, 255 g (2.4 moles) of 1,2-epoxy-3-chloroisobutane and 0.8 g of triethyl amine, and they were reacted under reflux for 2.5 hours while stirring. Subsequently, 69.5 g of a 20 percent caustic soda aqueous solution were added dropwise over a period of time of 1.5 hours to the reaction mixture containing the resultant hydroxy-chlorobutyl ester, and the system was allowed to stand for 0.5 hour. Then, the reaction mixture was taken into a separating funnel, and the oil layer was returned to the reactor while the water layer was thrown away. Remaining 1,2-epoxy-3-chlorosiobutane and other unreacted matters were recovered by distillation. Then, 95 g of toluene were added to the content of the reactor, and 14 g of a 10 percent caustic soda aqueous solution were added dropwise over a period of time of 0.5 hour. Then, the system was allowed to stand for 1.5 hours. Then, the system was taken into the separating funnel again, and the oil layer was returned to the reactor, while the water layer was thrown away. Water was removed from the oil layer by means of a decanter and the remaining solution was filtered to recover toluene. Thus, 87 g of a transparent reddish brown, highly viscous, resinous epoxy ester were obtained. The recovery ratio of 1,2-epoxy-3-chloroisobutane was 90 percent and the yield of the resinous product was 93 percent. The analysis of the product showed that the product had an epoxy equivalent of 330, an acid vale of 0 and a molecular weight of 388.

EXAMPLE 11

The same reactor as used in Example 1 was charged with 59 g (0.4 mole) of phthalic anhydride, 15 g (0.2 mole) of tertiary butanol, 256 g (2.4 moles) of 1,2-epoxy-3-chloroisobutane, 7.2 g (0.4 mole) of water and 0.3 g of dimethylbenzyl amine, and the mixture was maintained at the refluxing temperature for 5 hours under stirring to form the hydroxychlorobutyl ester. Subsequently, the reaction system was cooled to 45° C. and 34 g of 48 percent caustic soda were added dropwise to the system. In this state the reaction was continued for 4 hours, followed by addition of 46 g of water and 30-minute agitation. Then, the reaction mixture was taken into a separating funnel, and the oil layer was returned to the reactor, while the water layer was thrown away. Remaining 1,2-epoxy-3-chloroisobutane and other unreacted matters were recovered by distillation. Thereafter, 110 g of methylethylketone were added to the content of the reactor, and then 16 g of 10% caustic soda were added dropwise under reflux. The reaction mixture was allowed to stand in this state for 1.5 hours, followed by cooling. The reaction mixture was thrown into a separating funnel and the oil layer was returned to the reactor, while the water layer was thrown away. Then, methylethylketone was recovered from the oil layer by distillation. The remaining resinous matter was filtered at an elevated temperature to obtain 108 g of a transparent, faintly yellow, highly viscous, resinous epoxy ester. The recovery ratio of 1,2-epoxy-3-chloroisobutane was 97 percent and the yield of the resin was 96 percent. The analysis of the resin showed that the product had an epoxy equivalent of 265, the acid value of 0 and a molecular weight of 535.

What we claim is:

1. A process for the preparation of halohydrin esters which comprises reacting a polycarboxylic anhydride with an epoxy halogen compound at the reflux temperature in the presence of (1) water in an amount of at least about one mol per one equivalent of the anhydrous carboxyl group in said polycarboxylic anhydride, (2) tertiary alcohol selected from tertiary butanol and tertiary amyl alcohol in an amount of 0.05 to 2.00 mols per one equivalent of the anhydrous carboxyl group in said polycarboxylic anhydride, and (3) catalytic amount of a reaction-promoting substance selected from tertiary amines, quaternary ammonium salts, alkali metal hydroxides, lithium chloride and boron trifluoride, said polycarboxylic anhydride being selected from phthalic anhydride, tetrahydrophthalic anhydride, hexahydrophthalic anhydride, tetrabromopthalic anhydride chlorendic anhydride, maleic anhydride, itaconic anhydride, succinic anhydride, dodecenylsuccinic anhydride, trimellitic anhydride, methylcyclohexenetri-carboxylic anhydride, pyromellitic dianhydride and benzophenonetetracarboxylic dianhydride, and said epoxy halogen compound being a 1,2-epoxy-3-haloalkane compound containing three or four carbon atoms.

2. The process of claim 1, wherein said epoxy halogen compound is used in an amount of at least two moles per one equivalent of the anhydrous carboxyl group of said polycarboxylic anhydride.

* * * * *